G. A. LUTZ.
METAL PIPE.
APPLICATION FILED JUNE 24, 1909.
952,077.
Patented Mar. 15, 1910.
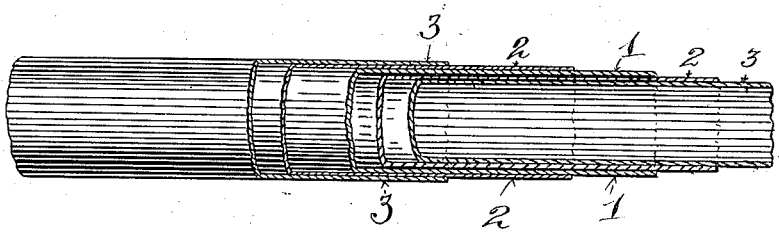

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

METAL PIPE.

952,077.  Specification of Letters Patent.  Patented Mar. 15, 1910.

Application filed June 24, 1909. Serial No. 504,006.

*To all whom it may concern:*

Be it known that I, GEORGE A. LUTZ, a citizen of the United States, and resident of Plainfield, in the county of Union and State of New Jersey, have invented certain new and useful Improvements in Metal Pipes, of which the following is a specification.

Metal pipes have been covered with insulation or enamel to protect them from rusting, but it is difficult to so apply the insulation or enamel to metal pipes as that the pipe will be fully protected at all parts, for the reason that the insulation or enamel is liable to crack or peel off and expose the metal pipe to the air. This applies to the exterior of the pipe where the insulation or enamel is liable to be cracked or peeled off during transportation and handling of the pipe, and when the same is bent, and it also applies to the interior of the pipe where the insulation or enamel is liable to crack or peel off when conductors are pulled through the pipe and when the pipe is bent.

The object of my invention is to protect the surface of the pipe from rusting or corrosion, even if the enamel is cracked or peeled off and if the enamel is not fully applied to all parts of the pipe during the process of coating the same.

In carrying out my invention I first thoroughly clean the metal pipe from scale in any well known manner, such as by pickling, pressure, or scraping, and upon the cleaned surface of the pipe I apply a coating that is non-abrasive and not liable to crack or peel off, such as a coating of black lead of commerce, graphite or plumbago, which may be applied by brushing it upon the pipe and into the pores thereof. Upon such coating I apply a protecting coating of insulating material of any well known kind, such as enamel baked on the pipe, which insulating coating or enamel will adhere to the first named non-cracking or non-abrasive coating, such as graphite or plumbago. Said coatings may be applied upon the outer surface or the inner surface of the pipe, or upon both such surfaces.

With a pipe protected in accordance with my invention, if the insulating or enamel coating becomes broken, cracked or peeled off the inner non-abrasive non-cracking or non-peeling coating, such as black lead, graphite or plumbago, will remain upon the pipe and thus will protect the same at such places from rusting or corrosion, for the graphite or plumbago will remain on the pipe when the insulation or enamel is cracked or peeled off. Furthermore, it is not practical to so apply insulation or enamel to metal pipe that it will cover or protect every part of the surface of the pipe, because there is liability that the insulation or enamel will not adhere to the pipe in some places, or pores or holes may be formed in the insulation or enamel which will permit access of air to the pipe, but by first applying the non-abrasive coating, such as graphite or plumbago, to the pipe the entire surface of the pipe may be thoroughly protected, by such coating and the pores of the pipe filled with such coating, whereby any open places or pores or holes in the insulation or enamel will be protected by the inner coating of graphite or plumbago.

In the accompanying drawings I have illustrated a metal pipe 1 upon the outer and inner surfaces of which is applied a non-cracking non-peeling or non-abrasive coating 2, of graphite, plumbago or the like, and at 3 is an insulating or enamel coating upon the coating 2.

Having now described my invention what I claim is:—

1. A metal pipe having a non-abrasive coating upon its surface, and an insulating coating upon the non-abrasive coating.

2. A metal pipe having a non-abrasive coating upon its inner surface, and an insulating coating upon the non-abrasive coating.

3. A metal pipe cleaned from scale and having upon its cleaned surface a non-abrasive coating, and an insulating coating upon the non-abrasive coating.

4. A metal pipe having a coating of graphite upon its surface, and an insulating coating upon the graphite coating.

5. A metal pipe having a graphite coating upon its inner surface, and an insulating coating upon the graphite coating.

Signed at New York city, in the county of New York, and State of New York, this 22d day of June, A. D. 1909.

GEORGE A. LUTZ.

Witnesses:
T. F. BOURNE,
MARIE F. WAINRIGHT.